Figure 1:
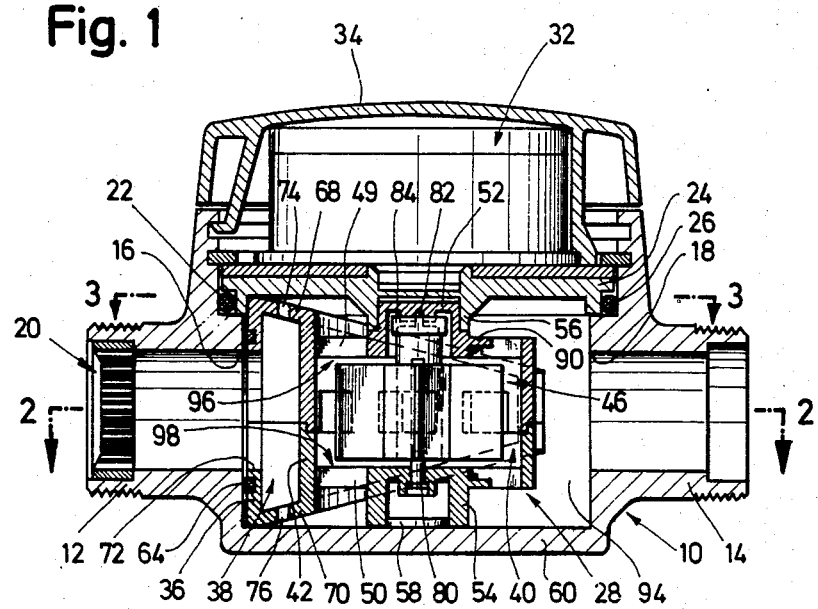

United States Patent [19]

Konrad et al.

[11] Patent Number: 4,512,201

[45] Date of Patent: Apr. 23, 1985

[54] FLOW VOLUMETER FOR LIQUIDS

[75] Inventors: Peter Konrad, Heimsheim; Adam Mechel, Esslingen, both of Fed. Rep. of Germany

[73] Assignee: Wassermesserfabrik ANDRAE GmbH & Co., Leonberg, Fed. Rep. of Germany

[21] Appl. No.: 501,099

[22] Filed: Jun. 6, 1983

[30] Foreign Application Priority Data

Dec. 22, 1982 [DE] Fed. Rep. of Germany ....... 3247376

[51] Int. Cl.³ .............................................. G01F 1/06
[52] U.S. Cl. .............................................. 73/861.79
[58] Field of Search ........... 73/861.33, 861.79, 861.87, 73/861.88

[56] References Cited

U.S. PATENT DOCUMENTS 4,131,017 12/1978 Back ................................. 73/861.79

FOREIGN PATENT DOCUMENTS

| 144800 | 2/1936 | Austria . |
| EP45588 | 2/1982 | European Pat. Off. ......... 73/861.79 |
| 15533 | 9/1881 | Fed. Rep. of Germany . |
| 104152 | 10/1898 | Fed. Rep. of Germany . |
| 2430904 | 1/1976 | Fed. Rep. of Germany ... 73/861.79 |
| 3015687 | 11/1980 | Fed. Rep. of Germany . |

*Primary Examiner*—Herbert Goldstein
*Attorney, Agent, or Firm*—Kramer & Brufsky

[57] ABSTRACT

A flow volumeter for liquids has an impeller chamber and an inflow chamber partially encircling the impeller chamber. In order to achieve a symmetrical load on the bearing for the impeller axis, the flow-directing openings in the circumferential wall of the impeller chamber, said openings facing the inflow openings of the inflow chamber, have smaller dimensions that the flow-directing openings facing away from the inflow chamber. In addition, the upper and lower regions of the impeller chamber are provided with outlet openings. Finally, the flow cross section of the inflow chamber decreases in size in the direction of flow.

18 Claims, 14 Drawing Figures

FLOW VOLUMETER FOR LIQUIDS

The invention relates to a flow volumeter for liquids comprising a cup-shaped outer housing having at its circumference an inflow opening and an outflow opening positioned approximately opposite each other and also comprising a measuring chamber unit insertable into the outer housing, the measuring chamber unit forming an impeller chamber and an inflow chamber embracing the impeller chamber, the inflow chamber having an inlet opening communicating with the inflow opening and an impeller being rotatably mounted in the impeller chamber with its axis of rotation approximately perpendicular to the bottom of the outer housing, the impeller chamber also having a circumferential wall, which is disposed in particular concentrically to the impeller axis and in which a plurality of flow-directing openings is located, the flow-directing openings all being unidirectionally inclined relative to the radial direction in the direction of rotation of the impeller, and also comprising at least one outlet opening from the impeller chamber communicating with the outflow opening.

The cup-shaped outer housing, described above, is also intended to include those housings, with which only the lower part is shaped like a cup. It should also be clearly understood that the inflow chamber does not have to encompass the impeller chamber completely, i.e. through 360°. The inflow chamber can, for example, be formed by the circumferential wall of the impeller chamber and the outer housing so that, in this case, the inlet opening to the inflow chamber is formed by the inflow opening of the outer housing. In a preferred embodiment of the invention, the measuring chamber unit also forms the walls bordering the inflow chamber and therefore its inlet opening. This means that all the elements essential for the hydraulic qualities of the flow volumeter are formed by the measuring chamber unit. This has the advantage that the flow volumeter can be opened and the measuring chamber unit replaced without the meter having to be calibrated again. Otherwise, the outer housing would have to be dismounted from the pipe so that calibration could be effected elsewhere, at a calibration station. Finally, it should be pointed out that the inflow and outflow openings of the outer housing need not be exactly opposite each other; the axes of these openings may form, for example, an angle of 110° instead of 180°.

The invention relates in particular to such flow volumeters, which are used for measuring the amount of cold, warm and hot water used and as volume gauges for calorimeters.

In the case of known flow volumeters the measuring chamber unit and the cup-shaped outer housing form the inflow chamber. Since the measuring chamber unit is disposed in the outer housing, such that the axis of rotation of the impeller is located in the center of this housing, the inflow chamber—seen in the direction of the impeller axis—has approximately the shape of part of a circular ring which is concentric to the impeller axis. The flow-directing openings located in the circumferential wall of the measuring chamber unit, which forms at the same time the circumferential wall of the impeller chamber, are all of the same design and dimensions, and they are located in the lower part of the circumferential wall of the impeller chamber. The upper region of the impeller chamber contains a plurality of outlet openings distributed at regular intervals around the circumference of the impeller chamber. This customary construction and arrangement of the inflow chamber and flow-directing and outlet opening results, because of, inter alia, an unsymmetrical flow pattern of the liquid directed against the impeller, in an unsymmetrical load on the impeller bearing and, therefore, in non-optimal measuring characteristics in known flow volumeters.

The flow-directing openings of the known flow volumeters all have the same dimensions and are inclined in the same way relative to the radial direction the flow-directing openings. Such flow directing openings are located on one side of the plane running through the impeller axis and the centers of the inflow and outflow openings of the outer housing. Thus, these flow directing openings offer greater flow resistance to the liquid than the flow-directing openings situated on the other side of this plane so that the flow pattern of the liquid directed against the impeller will be unsymmetrical. In addition, tests have shown that the flow velocities of the liquid upstream of the flow-directing openings also have an influence on the load, to which the impeller bearing is subjected, as well as on the measurable, minimum flow volume per unit of time. It is, however, easy to see that the flow velocity of the liquid in the inflow chamber will decrease as the distance from the inflow opening of the outer housing increases, due to the fact that the cross section of the inflow chamber is, when seen in the direction of flow, approximately the same size along its entire length. The same applies for the outflowing liquid in the region between the outlet openings of the impeller chamber and the outflow opening of the outer housing. A further unsymmetrical load on the impeller bearing is caused by the fact that, in the case of the known flow volumeters, the liquid flows into the lower part of the impeller chamber and leaves again from its upper region so that the flow of liquid to the impeller is from bottom to top—if the flow components in the direction of rotation are ignored.

The known constructions also have other disadvantages. Since the impeller chamber has a bottom provided with so-called turbulence ribs, dirt entering the flow volumeter will tend to collect on the bottom of the impeller chamber and, therefore, in the region of one impeller bearing. This not only impairs the bearing, but also reduces the effect of the turbulence ribs. Also, the sharp edges on the ends of the flow-directing and outlet openings or ducts, which are inclined relative to the radial direction, require tapered parts for the injection molding tools when producing the parts of the measuring chamber unit, which are made from plastic injection moldings. Since the parts for the measuring chamber unit are best produced from glass fiber reinforced plastic materials for reasons of the strength, stability and temperature consistency required, and a certain abrasion of the injection molding tools cannot be avoided when working such materials, this abrasion will have a relatively swift effect on sharp-edged or acute-angled tool parts. Thus, it cannot be guaranteed that parts manufactured in mass production, and the measuring characteristics of such parts, will be identical.

The object underlying the present invention was to create a flow volumeter of the type described, which has better measuring characteristics (such as ease of action and less abrasion) than the known meters described above due to a reduced load on the impeller bearing. The flow volumeter of the present invention may, nevertheless, be produced as cheaply or even cheaper than known meters and with a consistent accuracy despite mass production.

To accomplish this object it is suggested, first of all, according to the invention, that the flow cross sections of the inflow chamber decrease in size on both sides of its inlet opening in the direction of flow and/or the impeller chamber, when seen in the axial direction, has at least one outlet opening on each side of its flow-directing openings. The first measure enables the flow velocities of the liquid upstream of the flow-directing openings to be equalized, and thereby the differences in the load on the impeller bearing to be at least reduced in the radial and axial directions. The second measure results in the load on the impeller bearing being decreased in the axial direction. Each of the inventive measures comes a considerable step closer to the aim of having a symmetrical load on the impeller bearing, which is why each measure can be viewed as an invention in itself. Another advantage of the feature that outlet openings are provided in both the top and bottom regions of the impeller chamber is that heavyweight dirt can exit from the bottom of the impeller chamber, while air and lightweight dirt can exit from the top.

The flow velocities upstream of all the flow-directing openings will be absolutely identical when the flow cross section of the inflow chamber, directly in front of each flow-directing opening, divided by the flow cross section of the inflow chamber directly in front of the first flow-directing opening of the relevant side of the chamber, amounts, at least approximately, to $(m-n)/m$ when "m" is the total number of flow-directing openings on one side of the chamber and "n" is the number of flow-directing openings located on this side of the chamber upstream of the flow-directing opening in question.

In order to create the same conditions for the liquid leaving the impeller chamber as for the liquid flowing through the inflow chamber, i.e. to have equalized flow velocities downstream of the outflow openings, it is recommended that the construction be designed such that for the liquid leaving the impeller chamber, a flow path leads from each of the upper and lower outlet openings to the outflow opening of the outer housing, and that the flow cross sections of these flow paths increase in size in the direction towards the outflow opening. In order to achieve such an increase in the flow cross section of one of the flow paths mentioned it is suggested that at least one of the flow paths for the liquid leaving the impeller chamber is separated from the inflow chamber by a partition wall which, when viewed vertically to the impeller axis and to the connecting line between inflow and outflow openings, is inclined relative to a plane perpendicular to the impeller axis. This feature results at the same time in the flow cross section of the inflow chamber decreasing in size in the direction of flow. In the case of a particularly advantageous embodiment of the inventive flow volumeter the inflow chamber, in the direction of the impeller axis, is bordered on both sides by partition walls, which are inclined towards each other in the direction towards the outflow opening.

In the case of a flow volumeter having such an inclined partition wall the constructional height may be reduced when the circumferential wall of the inflow chamber ends at this partition wall in the direction of the impeller axis since in this case the space between the circumferential wall of the inflow chamber and the outer housing may be used as additional volume for the liquid flowing out of the impeller chamber.

The aim of having a symmetrical load on the impeller bearing is also facilitated because the flow-directing openings do not all have the same dimensions. Instead, according to the invention, the flow-directing openings inclined towards the inlet opening of the outer housing are provided with a smaller total cross section than the flow openings pointing away from this inlet opening. This compensates for the differences in the deflection conditions for the liquid entering through the flow-directing openings, which deflection conditions influence flow resistance.

In order to come closer to the ideal that all the outlet openings for the liquid leaving the impeller chamber offer the same flow resistance, it is further recommended that a plurality of outlet openings be provided in each of the end walls defining the impeller chamber on both sides in the direction of the impeller axis, the outlet openings lying nearer to the outflow opening having a smaller cross section than those positioned further away.

The feature that the flow cross sections of the inflow chamber are reduced in size on both sides of its inlet opening in the direction of flow may be achieved not only by the inclined partition walls already mentioned, but also, according to a further proposal, by an eccentric arrangement of the inflow chamber.

In a preferred embodiment of the inventive flow volumeter, the inflow chamber is disposed eccentrically to the impeller axis and displaced towards the inflow opening. In this way, the inflow chamber, when seen in the direction of the impeller axis, has an approximately crescent-shaped form. A further advantage is achieved by this measure, i.e. the cross section of the inflow chamber in the region of the inflow opening to the outer housing is determined by the loss of pressure required by the flow volumeter and cannot therefore be reduced in size. When the diameter of the impeller chamber and of the inflow chamber disposed concentrically to the impeller axis is predetermined, the minimum diameter of the flow volumeter is also fixed. It may, however, be reduced in size in comparison with the known constructions due to the eccentric arrangement of the inflow chamber, namely by the degree of eccentricity. Whereas the so-called multi-jet meters, with which a plurality of flow-directing openings is provided for the impeller, have a constructional length of at least 165 mm, the flow volumeter of the present invention, with its eccentric inflow chamber, can have a constructional length of only 130 mm. Due to the conditions of inflow and outflow created by the invention, the pressure loss caused by the meter can be reduced in comparison with that of known constructions.

In this connection it should be mentioned that in the case of an inventive flow volumeter having an eccentrically disposed inflow chamber, the above-mentioned partition walls between the inflow chamber and the flow paths for the liquid leaving the impeller chamber are, when viewed in the direction of the impeller axis, designed as a graduated ring and their width is decreased in the direction of the outflow opening of the outer housing.

If the measuring chamber unit forms, with its circumferential wall, the inflow chamber, which is bordered on both sides in the direction of the impeller axis by end walls, it is recommended that, at least in the region of the inlet opening, at least one vent be provided in the upper wall and at least one opening for heavyweight dirt in the lower wall, so that air and dirt will be mostly eliminated before the liquid reaches the impeller chamber.

In the case of known flow volumeters, a filter is disposed in a short pipe which forms the inflow opening to the outer housing. In order to combine all the elements which influence the hydraulic qualities of the flow volumeter in one interchangeable measuring chamber unit, it is suggested that the filter be disposed in the inlet opening located in a circumferential wall of the inflow chamber. A particularly preferred construction is that in which the housing of the measuring chamber unit, which forms the inflow and impeller chambers, is divided transversely to the impeller axis and through the inlet opening and the filter has a sealing lip abutting on the outer housing and is designed as a separate part and inserted into the inlet opening. Such a construction has the advantage that the sealing lip of the filter can serve the purpose of sealing the measuring chamber unit relative to the outer housing. The housing of the measuring chamber unit, which is produced from relatively hard plastic, is not suitable for this purpose for the above-mentioned reasons; given the present state of the art with regard to the technology of plastics injection molding it is no problem to provide the filter with a flexible sealing lip.

In this connection it is pointed out that the measuring chamber unit need not necessarily be sealed relative to the outer housing on the inlet side of this measuring chamber unit; to the contrary, it is also possible to collect the liquid leaving the measuring chamber unit in the latter and to provide a seal between the measuring chamber unit and the outflow opening of the outer housing in order to avoid any undesired bypassing of the impeller chamber between the inflow and outflow openings of the outer housing.

In order to guarantee the reproducibility of the inventive flow volumeter in series production, it is recommended that the surfaces bordering the flow-directing openings, at least, be designed such that they have no acute-angled edges in the cross section transverse to the impeller axis. In this way, acute-angled or sharp-edged parts or areas, which would be abraded relatively quickly, can be avoided on the injection molding tool. In the case of a preferred embodiment of the flow volumeter of the present invention, the acute-angled edges of the circumferential wall of the impeller chamber, which result from the inclination of the flow-directing openings, have been replaced by flat surfaces—of the flow-directing openings, have been replaced by flat surfaces—in cross section transversely to the impeller axis—having a width of approximately 0.5 to 1 mm or by radii of approximately 0.2 to 0.5 mm.

So that the flow volumeter can, as is customary, also ascertain the amount of liquid flowing through the meter when this flow occurs in the reverse direction, the outlet openings of the impeller chamber are inclined relative to the direction of rotation of the impeller such that a torque opposed to the normal direction of rotation of the impeller results when liquid flows into the meter from the outlet opening. Meters having this feature are still to be considered part of the invention when the flow volumeter is installed the opposite way, i.e. when the opening in the outer housing, which is designated above as the outflow opening, is connected to the supply of liquid so that the meter will normally have liquid flowing through it in the reverse direction. Such a meter still has the advantages described above.

Additional features, advantages and details of the invention are given in the attached claims and/or the following specification and the attached drawings showing several, particularly favorable embodiments of the flow volumeter according to the invention.

Figure 2:
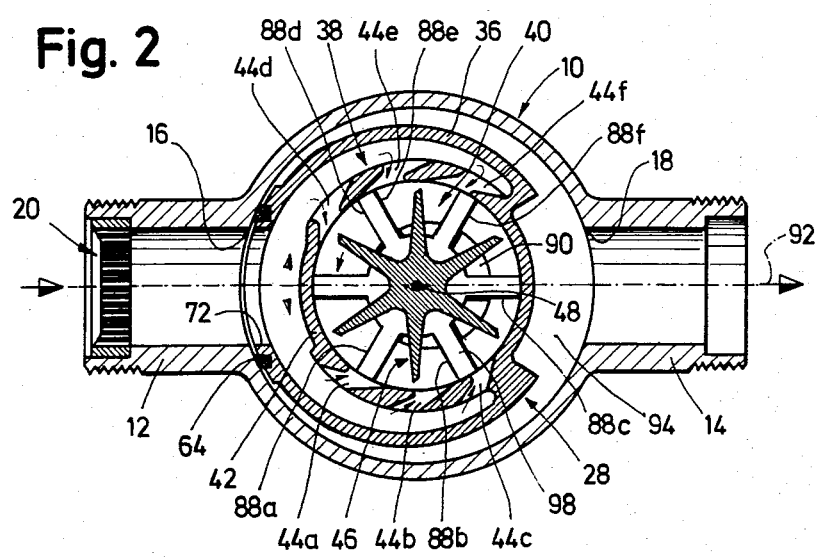
Figure 3:
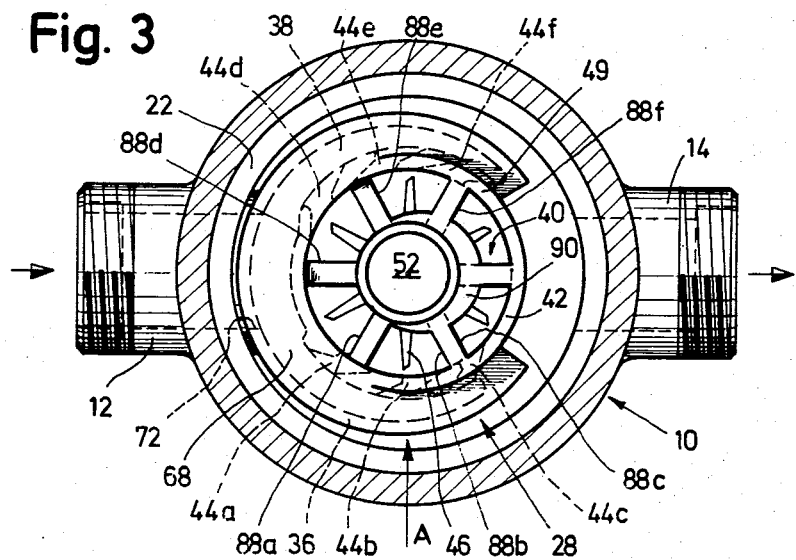
Figure 4:
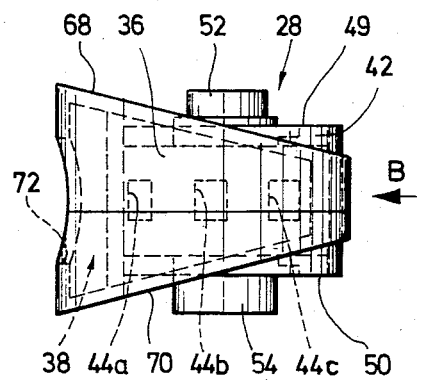
Figure 5:
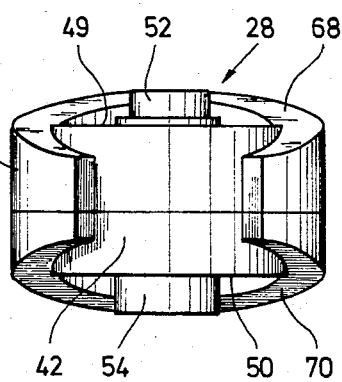
Figure 6:
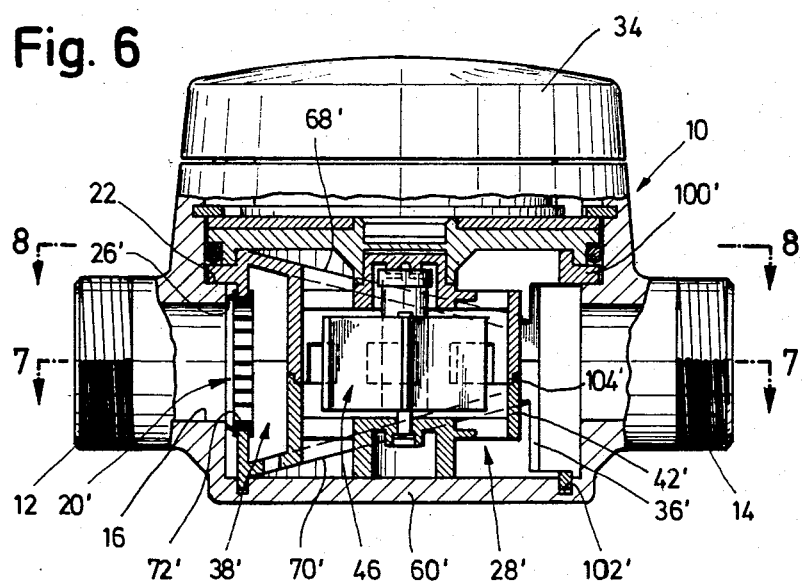
Figure 7:
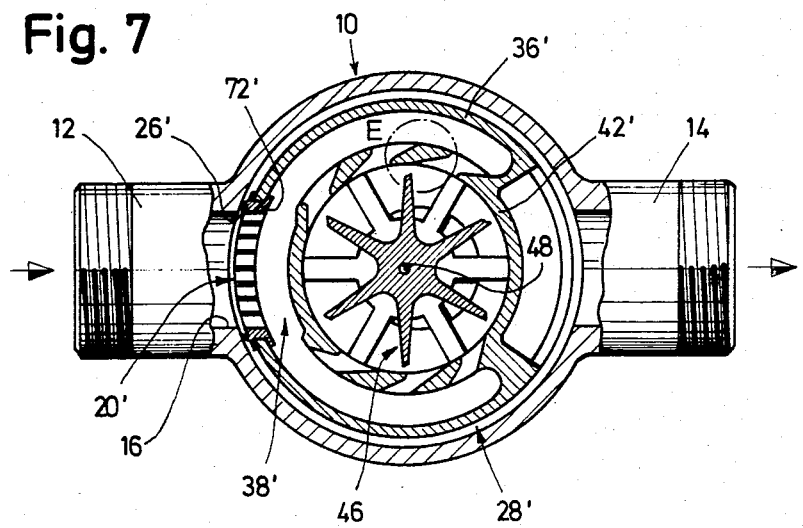
Figure 8:
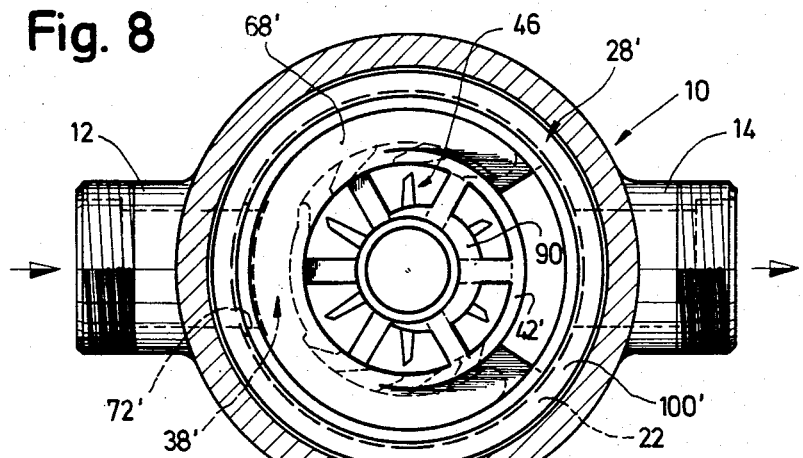
Figure 9:
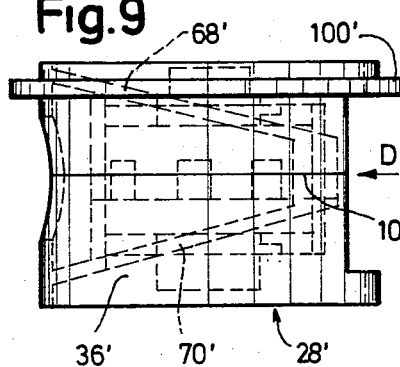
Figure 10:
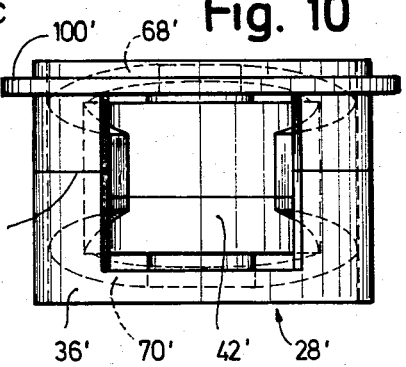
Figure 11:
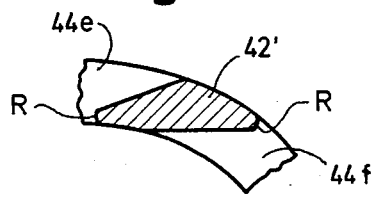
Figure 12:
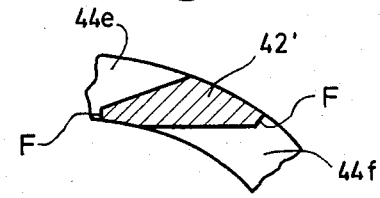
Figure 13:
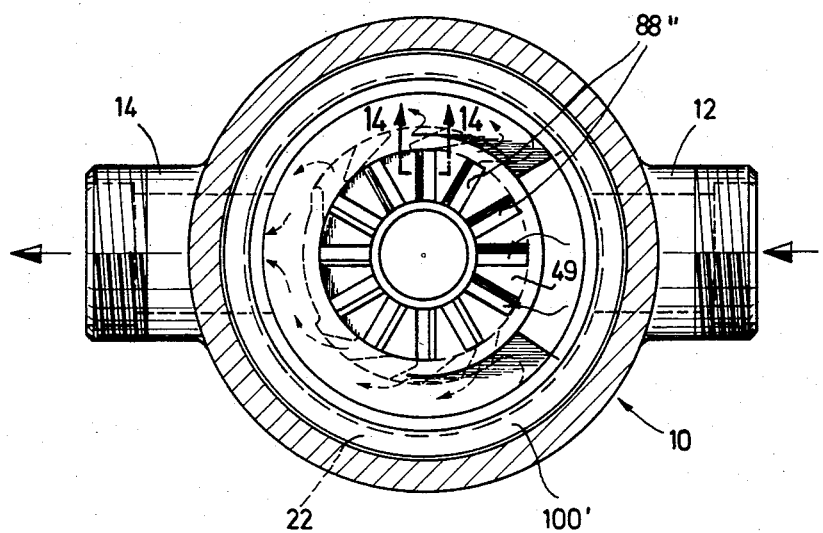
Figure 14:
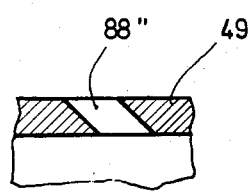

The drawings show:

FIG. 1, a cross section through a first embodiment parallel to and through the impeller axis;

FIG. 2, a cross section perpendicular to the impeller axis along line 2—2 in FIG. 1;

FIG. 3, a further cross section perpendicular to the impeller axis along line 3—3 in FIG. 1 but without a closure plate;

FIG. 4, a side view of the measuring chamber unit, seen in the direction of arrow A in FIG. 3;

FIG. 5, a view of the measuring chamber unit from the back, seen in the direction of arrow B in FIG. 4;

FIG. 6, illustration of a second embodiment corresponding to FIG. 1;

FIG. 7, a cross section through this second embodiment along line 7—7 in FIG. 6;

FIG. 8, a cross section through the second embodiment along line 8—8 in FIG. 6 but without a closure plate;

FIG. 9, a side view of the measuring chamber unit, seen in the direction of arrow C in FIG. 8;

FIG. 10, a view of the measuring chamber unit from the back, seen in the direction of arrow D in FIG. 9;

FIG. 11, the section "E" of FIG. 7 in enlarged illustration;

FIG. 12, a modification of the section "E" shown in FIG. 7;

FIG. 13, illustration of a third embodiment corresponding to FIGS. 3 and 8, which has the same advantages as the other embodiments but a reverse flow and FIG. 14, a cross section along line 14—14 in FIG. 13.

The first embodiment, which is to be explained on the basis of FIGS. 1 to 5, is characterized by an inflow chamber disposed eccentrically to the impeller axis.

The flow volumeter has an outer housing 10, which is approximately cup-shaped and has an inflow and an outflow pipe 12 and 14, respectively, opening into the housing cavity via an inflow and an outflow opening 16 and 18, respectively. A filter 20 is inserted into the inflow pipe 12. The outer housing 10 has an inner shoulder 22 extending around its circumference, a closure plate 24 resting on this shoulder and an O-ring 26 between the closure plate 24 and the outer housing 10 for the purpose of sealing the housing cavity, into which a measuring chamber unit 28 is inserted, at the top. The closure plate 24 supports a conventional cipher roll register 32, over which a cover 34, which is hinged onto the outer housing 10, may be closed.

The measuring chamber unit 28 has an outer circumferential wall 36, which encloses an inflow chamber 38, which encloses an inflow chamber 38, which is crescent-shaped when viewed from above. The measuring chamber unit 28 also has an impeller chamber 40, which is disposed eccentrically to the circumferential wall 36 and the inflow chamber 38 and has a circumferential wall 42, in which inclined flow-directing openings 44a to 44f are located. The impeller chamber accommodates an impeller 46, which is mounted on an impeller axis 48. The impeller chamber 40 is bordered by upper and lower walls 49 and 50, respectively, as well as the circumferential wall 42, the upper wall 49 bearing a centering boss 52 with a dome-shaped cross section and the lower wall 50 a cylindrical centering boss 54. These bosses interact with either a cylindrical centering boss 56 of the closure plate 24 or a massive centering boss 58 in the bottom 60 of the outer housing 10 such that an O-ring 64, which is set into the outer circumferential wall 36 of the measuring chamber unit 28 and encircles the inflow opening 16 of the outer housing 10, is pressed sealingly against the inner side of the outer housing 10. It should be emphasized that the impeller axis 48 and the impeller chamber 40 are centrally disposed in the outer housing 10. The inflow chamber 38 is separated from the cavity of the outer housing 10 by upper and lower partition walls 68 and 70, which are inclined towards each other and via which the outer circumferential wall 36 is connected to the circumferential wall 42 of the inflow chamber. A vent 74 is located in the upper partition wall 68 and a dirt opening 76 in the lower partition wall 70 in the region of the inlet opening 72 in the outer circumferential wall 36, which opening is enclosed by the O-ring 64. Heavyweight dirt particles, which have passed through the filter 20, will therefore leave the measuring chamber unit 28 to a large extent via the dirt opening 76 before they reach the impeller chamber 40 while air and lightweight dirt will leave the measuring chamber unit 28 via the vent 74.

As can be seen most clearly in FIGS. 3 and 5, the upper and lower partition walls 68 and 70 are approximately half-moon shaped and neither the outer circumferential wall 36 nor the circumferential wall 42 project beyond these partition walls in the direction of the impeller axis 48.

The lower end of the impeller axis 48 is pivotally mounted in a bearing 80 held by the lower end wall 50 whilst at the top of the impeller 46 is itself provided with a pivot pin 82, for which the centering boss 52 has a bearing. The reference numeral 84 designates one half of a magneto coupling borne by the impeller 46. The other half, which is not illustrated, is disposed in the roll register 32. This magneto coupling serves to transfer the impeller rotations to the roll register 32. Such a drive for roll registers having completely dry operation is known so that it is not necessary to go into more detail.

Six outlet openings 88a to 88f are disposed in each of the upper and lower end walls 49 and 50 of the impeller chamber 40. The interior cross section of these openings becomes smaller the closer the outlet opening is located to the outflow opening 18 of the outer housing 10. This is achieved by half-moon-shaped coverings 90 which are integral with the respective end wall 49 or 50.

The normal direction of flow through the inventive flow volumeter has been indicated in FIG. 2 by arrows. The liquid entering the flow volumeter through the filter 20 flows first of all into the inflow chamber 38 and is intended to be distributed equally to the two sides of the central plane 92 extending through the impeller axis 48. This is, however, only the case if care is taken that each of the flow-directing openings 44a to 44f offers the same flow resistance to the liquid flowing in. This is appropriately achieved in that, for example, the flow-directing openings 44a, 44b and 44c located on one side of the central plane 92 each have a smaller inner cross section than the flow-directing openings 44d, 44e and and 44f located on the opposite side of the central plane 92. Due to the strong deflection of the liquid at the inlet to the flow-directing openings 44d, 44e and 44f their inlet regions are greatly rounded off in the direction of the inlet opening 72. Due to measures such as these it is possible, according to the invention, to have exactly the same amount of liquid per unit of time flowing into the impeller chamber 40 through each of the flow-directing openings 44a to 44f on both sides of the central plane 92. So that the flow velocity at each flow-directing opening is at least approximately the same the inflow chamber 38 is tapered on both sides of the central plane 92 and in the direction of the outflow pipe 14 in such a way that the cross section of the inflow chamber available for the flow of liquid upstream of each flow-directing opening decreases according to the total number of cross sections of the flow-directing openings located upstream of the flow-directing opening in question.

After the liquid has driven the impeller 46 it leaves the impeller chamber in equal portions from top and bottom through the outlet openings 88a to 88f, the same effect as the tapering of the inflow chamber 38 being achieved for the liquid flowing out by the coverings 90. The liquid flows over and under the measuring chamber unit 28 to a flow-off chamber 94 and from there into the outflow pipe 14.

Radially extending turbulence ribs 96 or 98 are located in the known way above and below the impeller 46. In the case of the inventive flow volumeter these ribs are formed by the wall regions between the outlet openings 88a to 88f.

According to the invention, the vent 74 and the dirt opening 76 are also larger than the openings in the filter 20 in order to guarantee that only those dirt particles may pass through the filter 20, which may in any case leave the inflow chamber 38 via the openings 74 and 76. All the parts of the measuring chamber unit 28, possibly with the exception of the impeller axis 48 as well as the bearing for the impeller and the magneto coupling 84, are constructed according to the invention from plastic injection moldings and may therefore be produced cheaply and with great precision. Since the measuring chamber unit comprises all the parts essential for the hydraulic qualities of the flow volumeter no significant requirements need be set with regard to the exactness of the outer housing 10.

Also, the inventive flow volumeter may be modified without difficulty such that it is suitable for larger, maximum flow quantities in that, for example, the openings 74 and 76 are constructed in a suitable way and their size increased in order to create by-pass flow paths past the impeller chamber 40 to the outflow pipe 14.

In the following, the second embodiment according to FIGS. 6 to 10 is to be explained. This embodiment is characterized by an inflow chamber concentric to the impeller axis. However, the only features of the second embodiment, which will be described, are those not found in the first embodiment.

As best shown in FIGS. 9 and 10 the outer circumferential wall 36' of the measuring chamber unit 28' projects in axial direction beyond the upper and the lower of the two inclined partition walls 68', 70' and bears, at the top, a centering boss 100' which abuts on the inner shoulder 22 of the housing 10. At the bottom, the centering of the measuring chamber unit 28' is undertaken by a circumferential groove 102' in the bottom 60' of the housing, the outer circumferential wall 36' engaging in this groove.

When the inflow chamber 38' is disposed concentrically to the impeller axis 48 the decrease in size of the flow cross section available for the liquid in the inflow chamber is effected, in the direction away from the inlet opening 72', solely by the inclined partition walls 68' and 70' so that these must have a greater inclination than in the first embodiment according to FIGS. 1 to 5.

This results in the second embodiment being of a taller construction than the first embodiment.

As indicated by a joint face 104' the housing of the measuring chamber unit 28' is composed of an upper and a lower part. The joint face 104' extends through the inlet opening 72' so that it is possible to insert into this opening a filter 20', which is provided with a flexible sealing lip 26' and constructed as a plastic injection molding. The housing 10 is designed such that the measuring chamber unit 28', when inserted into the housing, is guided downwards at an angle and in the direction of the inflow opening 16; the sealing lip 26' is thereby pressed against the inner side of the housing 10. In the case of this embodiment the ideal condition is reached whereby all the features determining the hydraulic qualities of the flow volumeter are combined in the measuring chamber unit which may be interchanged without difficulty.

FIGS. 11 and 12 show that the areas of the circumferential wall 42 or 42' remaining between the flow-directing openings have no acute-angled edges since these have been replaced by rounded shoulders R or flat surfaces F.

In the case of the third embodiment according to FIGS. 13 and 14 the outlet openings 88a to 88f have been replaced by such inclined, slot-shaped outlet openings 88" that the impeller, in the plan view, rotates in a clockwise direction when the liquid flows in the reverse direction through the meter in accordance with the arrows in FIG. 13—in the case of normal flow (see FIG. 2) the impeller rotates in an anticlockwise direction.

If the outlet openings are therefore constructed such that they generate a swirling of the liquid flowing through the impeller chamber in the reverse direction the meter can count backwards, as is normally required. An inventive flow volumeter provided with this last feature may also be used such that it is connected to the supply of liquid by the pipe 14 designated above as the outflow pipe without losing any of the advantages of the invention.

We claim:

1. A flow volumeter for liquids comprising a cup-shaped outer housing having at its circumference an inflow opening and an outflow opening positioned approximately opposite each other and also comprising a measuring chamber unit insertable into the outer housing, said measuring chamber unit forming an impeller chamber and an inflow chamber embracing said impeller chamber, said inflow chamber having in its central area an inlet opening communicating with the inflow opening as well as an inflow chamber portion on each side of said inlet opening, an impeller being rotatably mounted in the impeller chamber with its axis of rotation approximately perpendicular to the bottom of the outer housing, the impeller chamber also having a circumferential wall in which a plurality of flow-directing openings are located, said flow-directing openings all being undirectionally inclined relative to the radial direction in the direction of rotation of the impeller, and comprising at least one outlet opening from the impeller chamber communicating with the outflow opening, characterized in that the flow cross sections of the inflow chamber decrease in size on both sides of its inlet opening in the direction of flow and up to termination of each of said inflow chamber portions, and the impeller chamber, when viewed perpendicular to its axial direction, has at least one outlet opening on each side of its flow-directing openings.

2. The meter according to claim 1, characterized in that the flow cross section of the inflow chamber directly in front of each of the inflow chamber portions divided by the flow cross section of the inflow chamber directly in front of the first flow-directing opening of said inflow chamber portion amounts, at least approximately, to $(m-n)/n$ when m is the total number of flow-directing openings on one side of the chamber and n is the number of flow-directing openings located on this side of the chamber upstream of the flow-directing opening in question.

3. The meter according to claim 1, characterized in that for the liquid leaving the impeller chamber, a flow path leads from each of the upper and lower outlet openings to the outflow opening and that the flow cross sections of these flow paths increase in size in the direction towards the outflow opening.

4. The meter according to claim 3, characterized in that at least one of the flow paths for the liquid leaving the impeller chamber is separated from the inflow chamber by a partition wall, which, when viewed perpendicular to the impeller axis and to the connecting line between inflow and outflow openings, is inclined relative to a plane perpendicular to the impeller axis.

5. The meter according to claim 4, characterized in that the inflow chamber, in the direction of the impeller axis, is bordered on both sides by partition walls, which are inclined towards each other in the direction towards the outflow opening.

6. The meter according to claim 4, characterized in that a circumferential wall of the inflow chamber ends at the partition wall in the direction of the impeller axis.

7. The meter according to claim 1, characterized in that the flow-directing openings inclined towards the inlet opening have a smaller total cross section than that flow-directing openings pointing away from the inlet opening.

8. The meter according to claim 1, characterized in that a plurality of outlet openings are provided in each of the end walls defining the impeller chamber on both sides in the direction of the impeller axis, the outlet openings lying nearer to the outflow opening having a smaller cross section than those positioned further away.

9. The meter according to claim 1, characterized in that the inflow chamber is disposed eccentrically to the impeller axis and displaced towards the inflow opening.

10. The meter according to claim 1, characterized in that the inflow chamber only partially embraces the impeller chamber and a flow-off chamber is provided between the impeller chamber and the outflow opening, the outlet openings communicating with the outflow opening via said flow-off chamber.

11. The meter according to claim 1, characterized in that, at least in the region of the inlet opening, at least one vent is disposed in the top and at least one heavy dirt opening in the bottom of the end walls defining the inflow chamber on both sides in the direction of the impeller axis.

12. The meter according to claim 1, characterized in that a filter is disposed in the inlet opening located in a circumferential wall of the inflow chamber.

13. The meter according to claim 12, characterized in that the housing of the measuring chamber unit which forms the inflow and impeller chambers, is divided transversely to the impeller axis and through the inlet opening and that the filter has a sealing lip abutting on the outer housing and is designed as a separate part and inserted into the inlet opening.

14. The meter according to claim 1, characterized in that the surfaces defining the flow-directing openings and/or the outlet openings have no acute-angled edges.

15. The meter according to claim 14, characterized in that the surfaces defining said flow-directing openings include surfaces which are flat in cross section transversely to the impeller axis and which have a width of approximately 0.5 to 1 mm.

16. The meter according to claim 14, characterized in that the surfaces defining said flow-directing openings include radii of approximately 0.2 to 0.5 mm.

17. The meter according to claim 1, characterized in that the outlet openings are inclined relative to the direction of rotation of the impeller such that a torque opposed to the normal direction of rotation of the impeller results when liquid flows into the meter from the outlet opening.

18. The meter according to claim 1 wherein said impeller chamber wall is disposed concentric to the impeller axis.

* * * * *